United States Patent
Campbell et al.

(10) Patent No.: US 9,450,910 B2
(45) Date of Patent: Sep. 20, 2016

(54) NETWORK ADDRESS ALLOCATION

(71) Applicant: Lenovo Enterprise Solutions (Singapore) Pte. Ltd., Singapore (SG)

(72) Inventors: Keith M. Campbell, Cary, NC (US); William M. Megarity, Raleigh, NC (US); Luke D. Remis, Raleigh, NC (US); Christopher L. Wood, Greenville, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 180 days.

(21) Appl. No.: 14/174,250

(22) Filed: Feb. 6, 2014

(65) Prior Publication Data
US 2015/0222593 A1    Aug. 6, 2015

(51) Int. Cl.
*G06F 15/177* (2006.01)
*H04L 29/12* (2006.01)
*H04N 21/6402* (2011.01)

(52) U.S. Cl.
CPC ......... *H04L 61/2015* (2013.01); *H04L 61/106* (2013.01); *H04N 21/6402* (2013.01)

(58) Field of Classification Search
CPC ................ H04L 61/2015; H04N 21/6402
USPC ................... 709/220–222, 225–228
See application file for complete search history.

(56) References Cited

U.S. PATENT DOCUMENTS

| | | | |
|---|---|---|---|
| 5,553,245 A * | 9/1996 | Su .................... | G06F 15/177 710/1 |
| 6,657,991 B1 * | 12/2003 | Akgun ............... | H04L 61/2015 709/218 |
| 7,016,324 B2 | 3/2006 | Agrawal et al. | |
| 8,681,695 B1 * | 3/2014 | Krishnan ............ | H04L 61/2015 370/328 |
| 8,725,852 B1 * | 5/2014 | Boddu ................ | H04L 61/2015 709/221 |
| 8,775,629 B1 * | 7/2014 | Whittle ............... | H04L 61/2092 709/245 |

(Continued)

FOREIGN PATENT DOCUMENTS

| JP | 2007-043390 A | 2/2007 |
|---|---|---|
| JP | 2011-145336 A | 7/2011 |

OTHER PUBLICATIONS

U.S. Appl. No. 14/102,555—Specification and Drawings Filed Dec. 11, 2013.

(Continued)

*Primary Examiner* — Bharat N Barot
(74) *Attorney, Agent, or Firm* — Law Office of Jim Boice

(57) ABSTRACT

A method, system, and/or computer program product allocates network addresses to network devices. A network address providing server designates a particular network address as a designated network address for use with a specific non-network device, where the specific non-network device has a Unique Device Capability Identifier (UDCI), and where the non-network device is not connected to a network. The designated network address is stored in a lookup table containing the UDCI, such that the lookup table associates the designated network address with the UDCI. In response to a request from a network device for a network address including the UDCI, the network address providing server retrieves the designated network address from the lookup table based on the UDCI found in the request for a network address. The designated network address is then sent to the network device for use as a network address of the network device.

19 Claims, 4 Drawing Sheets

(56) References Cited

U.S. PATENT DOCUMENTS

| | | |
|---|---|---|
| 2003/0126326 A1 | 7/2003 | Nomizo et al. |
| 2010/0100847 A1 | 4/2010 | Sato et al. |
| 2011/0066671 A1 | 3/2011 | Motohashi |
| 2011/0234896 A1 | 9/2011 | Ivashin et al. |
| 2011/0238793 A1* | 9/2011 | Bedare ............... H04L 61/2015 709/220 |
| 2011/0249198 A1 | 10/2011 | D'Alessio et al. |
| 2011/0305203 A1 | 12/2011 | Matsushita et al. |
| 2012/0173683 A1* | 7/2012 | Massam ............. H04L 12/2898 709/221 |
| 2013/0160081 A1* | 6/2013 | Barber ............... H04L 61/2015 726/3 |
| 2015/0124829 A1* | 5/2015 | Koodli ............... H04L 12/4633 370/392 |

OTHER PUBLICATIONS

U.S. Appl. No. 14/103,935—Specification and Drawings Filed Dec. 12, 2013.

Anonymous, "Assigning IP Addresses According to a MAC Address Using DHCP", Fortinet, Inc., Sunnyvale CA, Retrieved Jan. 24, 2014, pp. 1-2.

C. Lee et al., "Protocols for Service Discovery in Dynamic and Mobile Networks", Nova Science Publishers, Inc., International Journal of Computer Research, vol. 11, No. 1, 2002, pp. 1-12.

* cited by examiner

| DEVICE | UDCI | RESERVED IP ADDRESS |
|---|---|---|
| PROJECTOR A | EDID1 | IP ADDRESS 1 |
| PROJECTOR B | EDID2 | IP ADDRESS 2 |
| EXTERNAL HARD DRIVE X | HDCD1 | IP ADDRESS 3 |
| PRINTER I | PCD1 | IP ADDRESS 4 |
| "SMART" WHITEBOARD | WCD1 | IP ADDRESS 5 |
| DOCKING STATION | DSCD1 | IP ADDRESS 6 |

FIG. 3

NETWORK ADDRESS ALLOCATION

BACKGROUND

The present disclosure relates to the field of computing hardware, and specifically to hardware devices. Still more specifically, the present disclosure relates to allocating network addresses to network devices.

A network device is able to communicate over a network if it has a network address, with which other network-connected devices can communicate. An exemplary network address is an Internet Protocol (IP) address, that allows devices to communicate with one another over the Internet or over any network that utilizes the IP protocol. Such IP addresses can be in the public domain, or they can be owned by an enterprise for its exclusive use.

SUMMARY

A method, system, and/or computer program product allocates network addresses to network devices. A network address providing server designates a particular network address as a designated network address for use with a specific non-network device, where the specific non-network device has a Unique Device Capability Identifier (UDCI), and where the non-network device is not connected to a network. The designated network address is stored in a lookup table containing the UDCI, such that the lookup table associates the designated network address with the UDCI. In response to a request for a network address, from a network device, including the UDCI, the network address providing server retrieves the designated network address from the lookup table based on the UDCI found in the request for a network address. The designated network address is then sent to the network device for use as a network address of the network device.

The above as well as additional objectives, features, and advantages of the present invention will become apparent in the following detailed written description.

BRIEF DESCRIPTION OF THE SEVERAL VIEWS OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 3 depicts an exemplary lookup table used to locate an IP address for use by a network device that is attached to a non-network device having a particular EDID.

DETAILED DESCRIPTION

Figure 1:
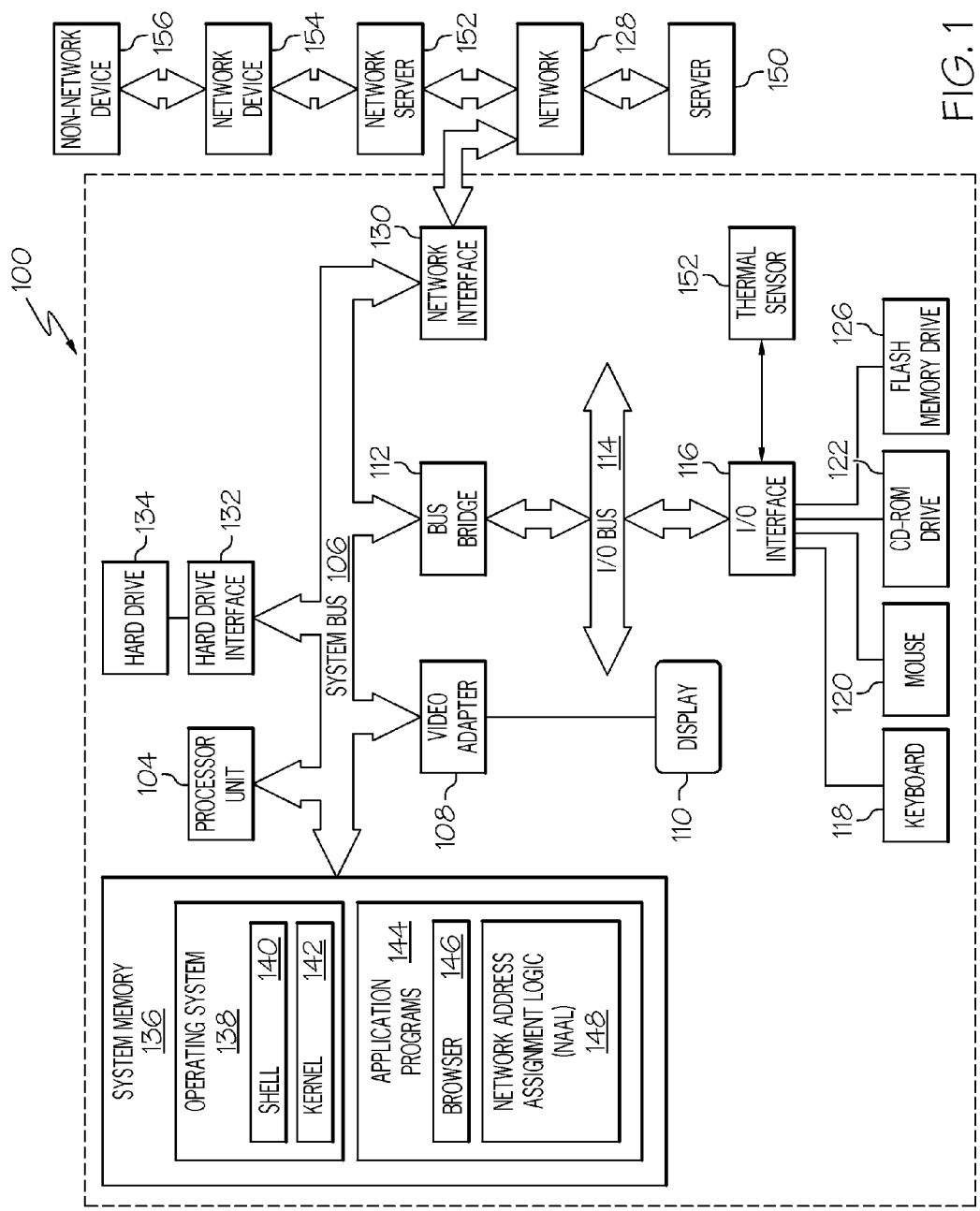
FIG. 1 depicts an exemplary physical computer in which the present invention may be implemented and/or utilized.

With reference now to FIG. 1, there is depicted a block diagram of an exemplary computer 100, with which and/or in which the present invention may be utilized. Computer 100 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Compact Disk—Read Only Memory (CD-ROM) drive 122, and a flash memory drive 126. The format of the ports connected to I/O interface 116 may be any known to those skilled in the art of computer architecture, including but not limited to Universal Serial Bus (USB) ports.

Computer 100 is able to communicate with a server 150 via a network 128 using a network interface 130, which is coupled to system bus 106. Network 128 may be an external network such as the Internet, or an internal network such as an Ethernet or a Virtual Private Network (VPN). Server 150 may be architecturally configured in the manner depicted for computer 100.

A hard drive interface 132 is also coupled to system bus 106. Hard drive interface 132 interfaces with a hard drive 134. In one embodiment, hard drive 134 populates a system memory 136, which is also coupled to system bus 106. System memory 136 is defined as a lowest level of volatile memory in computer 100. This volatile memory may include additional higher levels of volatile memory (not shown), including, but not limited to, cache memory, registers, and buffers. Code that populates system memory 136 includes an operating system (OS) 138 and application programs 144.

OS 138 includes a shell 140, for providing transparent user access to resources such as application programs 144. Generally, shell 140 (as it is called in UNIX®—UNIX is a registered trademark of The Open Group in the United States and other countries), also called a command processor in Windows® (WINDOWS is a registered trademark of Microsoft Corporation in the United States and other countries), is a program that provides an interpreter and an interface between the user and the operating system, and is generally the highest level of the operating system software hierarchy and serves as a command interpreter. Thus, shell 140 provides a system prompt, interprets commands entered by keyboard 118, mouse 120, or other user input media, and sends the interpreted command(s) to the appropriate lower levels of the operating system (e.g., kernel 142) for processing. As depicted, OS 138 also includes kernel 142, which includes lower levels of functionality for OS 138. Kernel 142 provides essential services required by other parts of OS 138 and application programs 144. The services provided by kernel 142 include memory management, process and task management, disk management, and I/O device management.

Application programs 144 include a browser 146. Browser 146 includes program modules and instructions enabling a World Wide Web (WWW) client (i.e., computer 100) to send and receive network messages to the Internet. Computer 100 may utilize HyperText Transfer Protocol (HTTP) messaging to enable communication with server 150. Application programs 144 in system memory 136 also include a Network Address Assignment Logic (NAAL) 148, which, in one embodiment, executes the process described below in FIGS. 2-4. In one embodiment, computer 100 is able to download NAAL 148 from service provider server 150, preferably in an "on demand" basis.

Note that computer 100 is also coupled to a network server 152. Network server 152 acts as an interface between computer 100 and a network device 154, which, as described below, needs a network address in order to communicate with network 128 (e.g., the Internet) and resources connected thereto (not depicted). As described in greater detail below, in one embodiment of the present invention, the network device 154 (i.e., a computer) is directly connected to a non-network device 156 (e.g., a projector). Note that the non-network device 156 is not connected to the network server 152, nor to network 128. Note further that network server 152 and/or network device 154 may utilize some or all of the components depicted for computer 100.

The hardware elements depicted in computer 100 are not intended to be exhaustive, but rather are representative to highlight essential components required by the present invention. For instance, computer 100 may include alternate memory storage devices such as magnetic cassettes, Digital Versatile Disks (DVDs), Bernoulli cartridges, and the like. These and other variations are intended to be within the spirit and scope of the present invention. Note that the hardware architecture for service provider server 150 may be substantially similar to that shown for computer 100.

Figure 2:
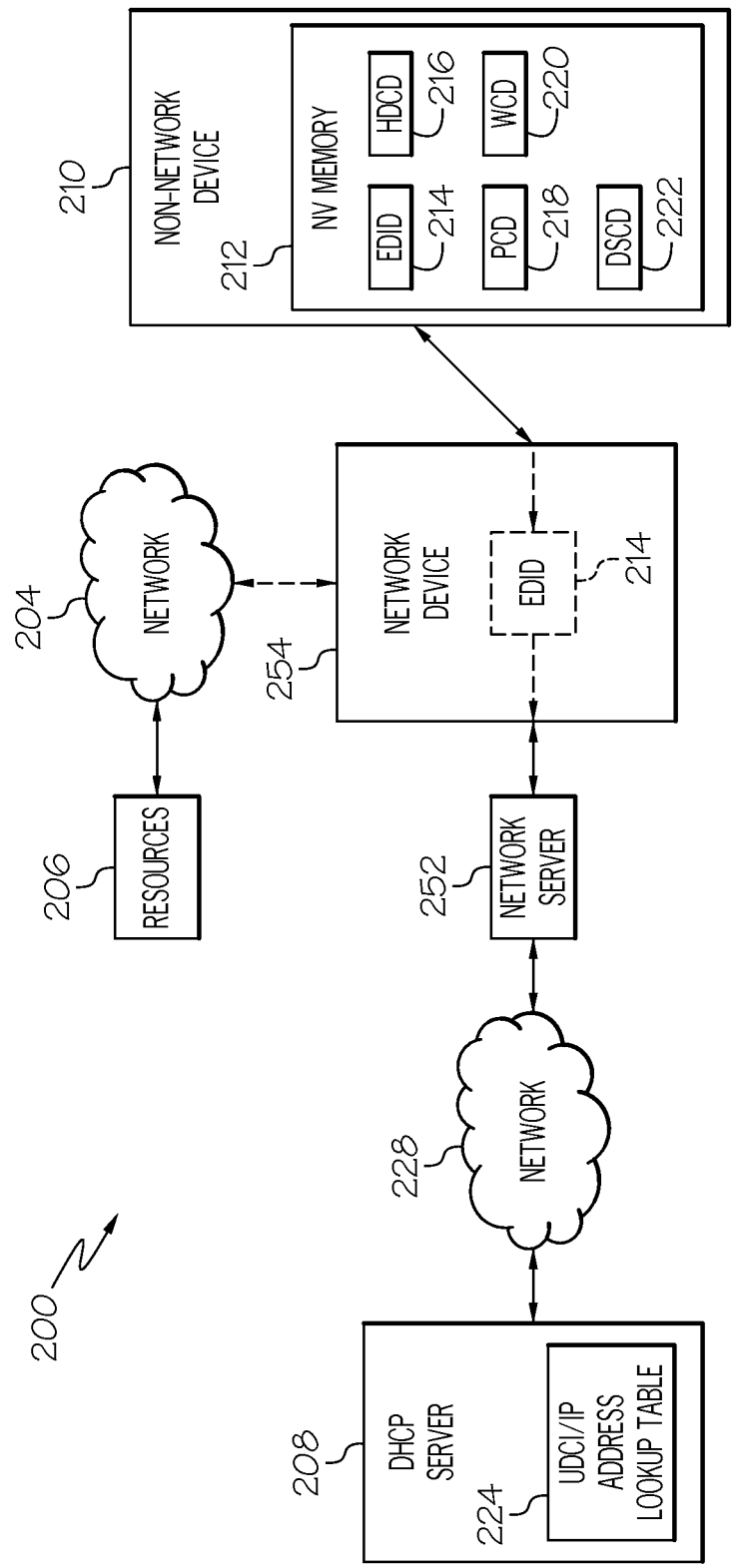
FIG. 2 illustrates an exemplary system in which Internet Protocol (IP) addresses are assigned to a network device according to the Extended Display Identification Data (EDID) of an attached non-network device.

With reference now to FIG. 2, an exemplary system 200 in which network addresses (e.g., Internet Protocol (IP) addresses) are assigned to a network device according to the Unique Device Capability Identifier (UDCI), (e.g., Extended Display Identification Data—EDID, discussed further below), of an attached non-network device is presented. For example, consider network device 254 (analogous to network device 154 shown in FIG. 1), which may be a laptop computer, a desktop computer, a tablet computer, a smart phone, or any similar type of computing device that is connectable to a network 204. Network 204 may be a local area network such as a Wi-Fi hotspot that connects to a wide area network such as the Internet, or network 204 may be the wide area network itself. However, in order to communicate with resources 206 that are connected to network 204, network device 254 needs a network address, such as an IP address. For purposes of illustration and clarity, the following scenarios describe the need of network device 254 to obtain an IP address from Dynamic Host Configuration Protocol (DHCP) server 208. However, it is understood that the processes described herein are adaptable to use with any type of network address and/or network address provider.

In a traditional scenario, network device 254 is able to obtain an IP address simply by requesting it from the DHCP server 208. However, such IP addresses are often limited. That is, certain enterprises often reserve/purchase certain IP addresses for their exclusive use. Such reserved IP addresses are expensive, and thus are limited in number. Therefore, a user of the network device 254 may or may not be able to obtain an IP address when he/she needs it (e.g., during a meeting and/or presentation). The present invention, however, addresses this issue by assigning a particular IP address to a particular non-network device, such as non-network device 210.

As the name suggests, non-network device 210 is never connected directly to a network, due to its lack of router/switching interfacing. That is, non-network device 210 can connect to a local device (e.g., a computer such as network device 254) using connecting cables, but non-network device cannot connect to and/or communicate with network 204, even to access network device 254. Nonetheless, the present invention recognizes that while there are not enough IP addresses available to give any network device an IP address on demand, there are enough IP addresses owned by the enterprise to reserve such IP addresses to fixed assets, such as the non-network device 210, which may be a projector, smart whiteboard, printer, etc.

Thus, when a user needs to access network 204 (e.g., for a presentation) using his network device 254 (e.g., his laptop), the present invention ensures that network device 254 will be able to obtain an IP address from DHCP server 208 only if network device 254 is connected to non-network device 210. As described herein, each non-network device within system 200, including the depicted non-network device 210, has a reserved IP address. While the non-network device 210 has no use for an IP address itself (since it does not have the hardware/interface needed to connect to a network), its reserved IP address can be used by the network device 254 while the network device 254 is physically connected to the non-network device 210. The network device 254 is able to obtain this reserved IP address by proving that it is physically connected to the non-network device 210.

As depicted, non-network device 210 includes a non-volatile memory 212. Stored within non-volatile memory 212 is a Unique Device Capability Identifier (UDCI). In the case of non-network device 210 being a projector, the UDCI is Extended Display Identification Data (EDID) 214. EDID 214 is a data structure that describes its capabilities to a video source (e.g., a graphics card such as video adapter 108 shown in FIG. 1). Thus, EDID 214 enables a computer such as network device 254 to know what type of projector non-network device 210 is.

In one embodiment, non-network device 210 is an external storage device, such as a hard drive. As with a projector, a hard drive is able to provide a digital signal to the network device 254 describing the hard drive's capabilities, format, power requirements, etc. This information is found in a Hard Drive Capability Data (HDCD), shown as HDCD 216.

In one embodiment, non-network device 210 is another output device, such as a printer. As with a projector, a printer is able to provide a digital signal to the network device 254 describing the printer's capabilities, format, requirements, etc. This information is found in a Printer Capability Data (PCD), shown as PCD 218.

In one embodiment, non-network device 210 is an input device, such as a "smart" whiteboard that is able to detect surface pressure caused by a marker being pressed/moved against the surface of the whiteboard. These pressures/movements are conveyed to a host device as digital inputs. As with a projector, a "smart" whiteboard is able to provide a digital signal to the network device 254 describing the "smart" whiteboard's capabilities, format, power requirements, etc. This information is found in a Whiteboard Capability Data (WCD), shown as WCD 220.

In one embodiment, non-network device 210 is a docking station, into which a laptop such as network device 254 can be docked (i.e., electrically connected for use of an attached keyboard, monitor, mouse, etc.). As with a projector, a docking station is able to provide a digital signal to the network device 254 describing the docking station's capabilities, format, power requirements, etc. This information is found in a Docking Station Capability Data (DSCD), shown as DSCD 222.

With further reference to FIG. 2, assume that non-network device 210 is a projector. In this scenario, DHCP server 208 contains (or has access to) an EDID/IP address lookup table 224 (i.e., "lookup table 224"). Lookup table 224 is a table showing which network address is reserved for network devices while coupled to a particular (i.e., specific) projector. For example, consider lookup table 300 shown in FIG. 3. Several exemplary non-network devices are shown in lookup table 300, including Projector A, Projector B, External hard drive X, Printer I, "Smart" whiteboard, and Docking station. Note that in one embodiment, the UDCI (e.g., EDID 214) is for any projector of a particular make/model/type, while in another embodiment the UDCI includes a Unique Identifier (UID) that is exclusive to only one specific projector.

Continuing to refer to FIG. 2, assume that a user of network device 254 needs to communicate with resources 206 (e.g., video content) via network 204, while the network device 254 is connected to the projector depicted as non-network device 210. Network device 254 (analogous to network device 154 shown in FIG. 1) needs an IP address to communicate with resources 206, and thus sends the DHCP server 208 (analogous to computer 100 shown in FIG. 1) a request, via a network server 252 (analogous to network server 152 shown in FIG. 1) and network 228 (analogous to network 128 shown in FIG. 1). In order to receive one of the reserved IP addresses found in UDCI/IP address lookup table 224, this request must include the EDID 214 from non-network device 210. Note that, as indicated by the dashed lines, EDID 214 merely transits though network device 254, thus preventing network device 254 from storing a copy of EDID 214. This "pass through" feature prevents network device 254 from obtaining one of the reserved IP addressed found in lookup table 224 when not connected to the requisite non-network device 210. Once the DHCP server 208 receives the request with the EDID 214, it will look up that EDID 214 in the UDCI/IP address lookup table 224 in order to find that corresponding IP address for that projector (non-network device 210). The DHCP server 208 then returns that IP address, (in one embodiment with an authorization code as well), to the network device 254, which will then use that IP address as its own network address.

Figure 4:
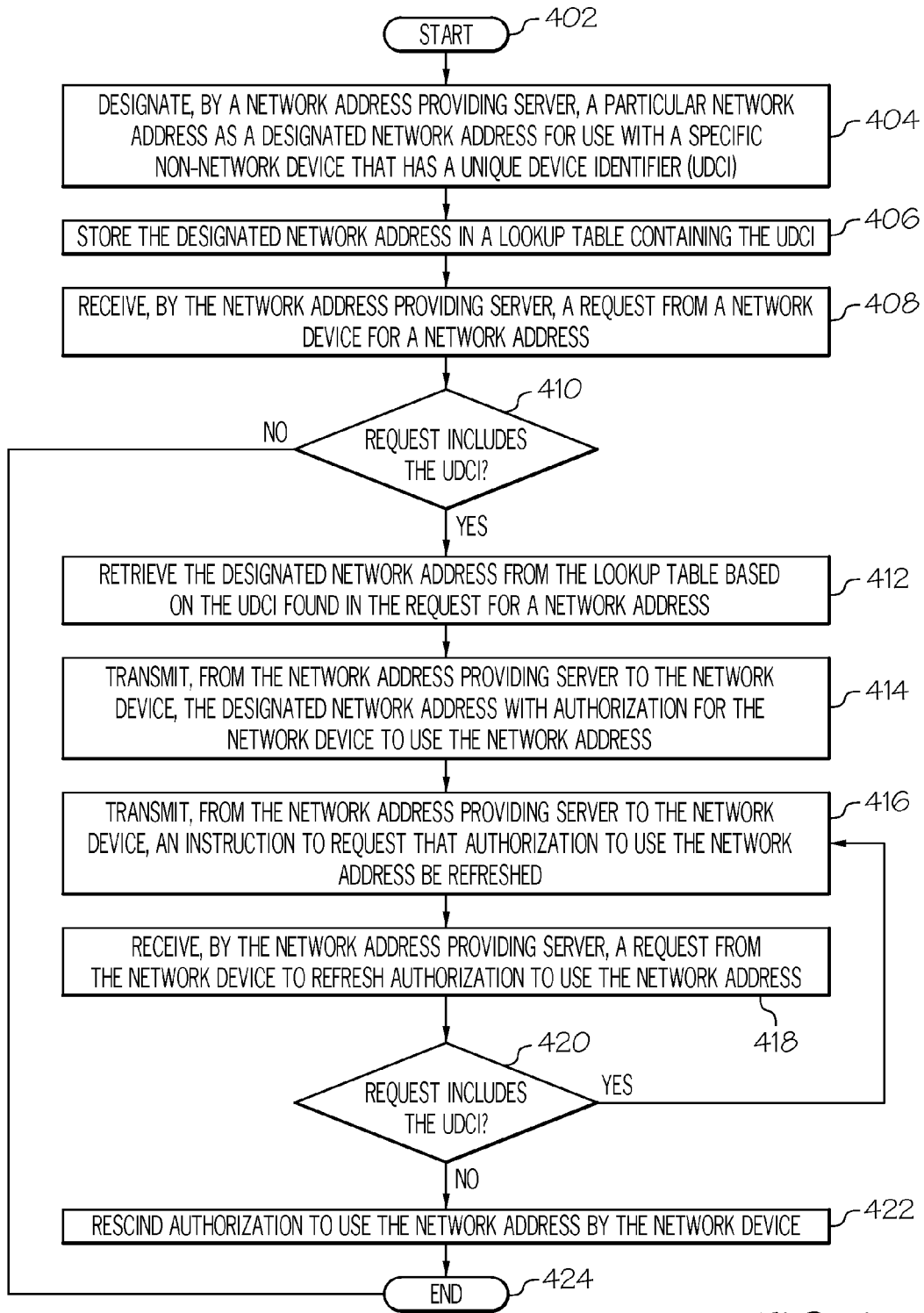
FIG. 4 is a high-level flow chart of exemplary steps performed by a system to selectively assign network addresses to network devices according to the non-network device that is presently attached to the network device.

With reference now to FIG. 4, a high-level flow chart of exemplary steps performed by a system to selectively assign network addresses to network devices according to the non-network device that is presently attached to the network device is presented. That is, a method is presented for allocating network addresses to network devices, based on an authorizing non-network device being presently coupled to the network device. After initiator block 402, a network address providing server (e.g., DHCP server 208 shown in FIG. 2) designates a particular network address as a designated network address (e.g., an IP address) for use with a specific non-network device (e.g., projector such as non-network device 210 shown in FIG. 2). As described herein, the specific non-network device has a Unique Device Capability Identifier (UDCI), such as an EDID. The EDID, which is specific for video projection/display devices, includes the name of the projector's manufacturer, the projector's serial number, the model number of the projector, the filter type used by the projector (i.e., what types of filters are used in the electronic projection circuitry), timings supported by the projector, a maximum effective display size for the projector, luminance information (i.e., how bright is the projection light source on the projector), and pixel mapping protocols.

In embodiments using non-network devices other than projectors, the UDCI provides a similar type of operation data. For example, a HDCD for a hard drive may include not only the make/model/manufacturer information, but also timing information, storage capacity, etc. of the hard drive. Similar information, unique for the device being described, is found in a PCD for a printer (e.g., what size paper can be handled, print speed, etc.); a WCD for a "smart" whiteboard (e.g., the dimensions of the whiteboard, the clock speed for capturing image data, etc.); or the DSCD for a docking station (i.e., what pin configuration can be mated to the laptop, what devices are pre-installed on the docking station, such as a keyboard, video display, etc.).

In one embodiment, the UDCI provides information that is specific for a particular non-network device (i.e., a single specific projector). In another embodiment, the UDCI provides information that describes a particular type of projector (e.g., the make and model of the projector), without being specific for any single projector.

Note that in all embodiments, the non-network device is not connected (or even connectable) to a network, due to lack of hardware/software capabilities, protocol incompatibility, or even operation rules established by an enterprise.

As described in block 406 in FIG. 4, the designated network address is stored (by the network address providing server in one embodiment) in a lookup table containing the UDCI. As depicted in exemplary manner in FIG. 3, the lookup table associates the designated network address with the UDCI. As described in block 408, the network address providing server (e.g., DHCP server 208 in FIG. 2) receives a request from a network device (e.g., network device 254 in FIG. 2) for a network address (e.g., an IP address). As described in query block 410, a query is made by the network address providing server to ascertain whether or not the request includes the UDCI. If so, then the network address providing server retrieves the designated network address from the lookup table based on the UDCI found in the request for a network address (block 412). Once the appropriate designated network address is located in the lookup table, it is transmitted from the network address providing server to the network device (block 414). Note that in one embodiment, an authorization code/message/signal is also sent from the network address providing server to the network device. The authorization code/message/signal enables the network device to use the newly-located network address. That is, this authorization code enables the network device to use that designated network address as its network address (e.g., that network address is assigned to the network device to use as its IP address).

The authorization code can be used to control the use of the located IP/network address by the network device. For example, as described in block 416 of FIG. 4, the network address providing server can transmit, to the network device, an instruction to request that authorization to use the authorized network address be refreshed. That is, the instruction tells the network device to ask the network address providing server to renew its lease on (e.g., authorization to use) the located network/IP address. As described in block 418, the network address providing server then receives a request from the network device to refresh the authorization for the network device to use the authorized network address. As described in query block 420, a determination is then made to ascertain whether or not this "refresh" request includes the UDCI found in the original request (see query block 410). If not, then the network address providing server rescinds the authorization for the network device to use the authorized network address as a network address of the network device (block 422). Note that since the network device cannot cache or otherwise store the UDCI, then it can only obtain it directly from the non-network device. Furthermore, the only way for the network device to obtain the UDCI from the non-network device is to be physically connected to (e.g., via electronic cables) the non-network device. The process ends at terminator block 424.

As described herein, in one embodiment the network address being requested is an Internet Protocol (IP) address, and thus the network address providing server is a Dynamic Host Configuration Protocol (DHCP) server.

As described herein, in one embodiment the network device is a computer. In various embodiments described herein, then, the non-network device that is connected to the network device (computer) is a projector, a storage device, a printer, an input device such as a "smart" whiteboard, a docking station, etc.

Note that in one embodiment, the reserved IP addresses (see FIG. 3), for use with a network device that is coupled to a non-network device, are fixed. That is, the specific IP addresses are reserved such that they are unusable by any other device, even when no network device is connected to the non-network device for which the IP address is reserved. This results in IP addresses going unused when their respective non-network devices are not in use (i.e., are not connected to a network device). Thus, in another embodiment, the reserved IP addresses (found in UDCI/IP address lookup table 224 shown in FIG. 2) come from a general pool of available IP addresses, thereby preventing the problem of having unused IP addresses (due to their exclusive reservation for use in conjunction with the non-network devices). However, in this other embodiment, the non-network devices still have priority in obtaining IP addresses. That is, if all IP addresses in the general pool are in use, and the network device 254 shown in FIG. 2 connects to the non-network device 210, then the DHCP server 208 will evict one of the IP address users (which are using an IP address from the general pool), and assign that evicted device's IP address to the network device 254 that just connected to the non-network device 210.

In one embodiment, the general pool of IP addresses is location and/or time dependent. For example, the general pool of IP addresses may be for a Wi-Fi hotspot in Room X in Building Y, and/or only for Jan. 1, 2018 between 2:00 PM and 3:00 PM. This general pool of IP addresses is initially available to any device in that location/time. However, if network device 254 shown in FIG. 2 connects to the non-network device 210, for whom priority is assigned in obtaining an IP address, and all of the IP addresses in the general pool have been taken, then the DHCP server 208 will evict one of the previous IP address users in that location/time. One priority of eviction is to evict the network device that took the last available IP address from the general pool during the allocated time period (and thus is penalized for showing up late). Another priority of eviction is to evict the network device that took the first available IP address from the general pool during the allocated time period (and thus has "had its turn" on the network). Another priority of eviction is to evict certain types of devices first. For example, "smart phones" may be evicted before laptop computers, since there is a greater likelihood that use of laptops is more relevant to the purpose of the meeting at this designated location/time than the use of smart phones, which are more likely to be used for personal reasons.

As described above, in one embodiment of the present invention a "refresh" request is required to continue the use of an IP address by the network device that is coupled to the authorized non-network device. In one embodiment, however, just disconnecting the network device 254 from the non-network device 210 depicted in FIG. 2 will generate a signal and message to the DHCP server 208. This message informs the DHCP server 208 of the disconnection, and automatically revokes the usage, by network device 154, of the IP address that the network device 254 utilized while connected to the non-network device 210.

Note that the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method for allocating network addresses to network devices, the method comprising:
   designating, by a network address providing server, a particular network address as a designated network address for use by any network device that is coupled to a specific non-network device, wherein the specific non-network device has a Unique Device Capability Identifier (UDCI), wherein the specific non-network device is not connected to a network, and wherein the particular network address is reserved for use by the network device while the specific non-network device is connected to the network device;
   storing the designated network address in a lookup table containing the UDCI, wherein the lookup table associates the designated network address with the UDCI;

receiving, by the network address providing server, a request from a network device for a network address;

in response to the request from the network device for the network address including the UDCI to identify the specific non-network device, retrieving, by the network address providing server, the designated network address from the lookup table based on the UDCI found in the request for the network address; and transmitting, from the network address providing server to the network device, the designated network address with authorization for the network device to use the designated network address as an authorized network address of the network device.

2. The method of claim 1, further comprising:

transmitting, from the network address providing server to the network device, an instruction to request that authorization to use the authorized network address be refreshed;

receiving, by the network address providing server, a request from the network device to refresh authorization for the network device to use the authorized network address; and in response to the request from the network device to refresh authorization failing to include the UDCI, rescinding, by the network address providing server, the authorization for the network device to use the authorized network address as the designated network address of the network device.

3. The method of claim 1, wherein the designated network address is an Internet Protocol (IP) address, and wherein the network address providing server is a Dynamic Host Configuration Protocol (DHCP) server.

4. The method of claim 1, wherein the network device is a computer.

5. The method of claim 4, wherein the non-network device is a projector that is connected to the computer.

6. The method of claim 4, wherein the non-network device is a storage device that is connected to the computer.

7. The method of claim 4, wherein the non-network device is a printer that is connected to the computer.

8. The method of claim 4, wherein the non-network device is an input device that is connected to the computer.

9. The method of claim 8, wherein the input device is a "smart" whiteboard.

10. The method of claim 8, wherein the input device is a docking station.

11. A computer program product for assigning and allocating network addresses to network devices, the computer program product comprising a non-transitory computer readable storage medium having program code embodied therewith, the program code readable and executable by a processor to perform a method comprising:

designating, by a network address providing server, a particular network address as a designated network address for use by any network device that is coupled to a specific non-network device, wherein the specific non-network device has a Unique Device Capability Identifier (UDCI), wherein the specific non-network device is not connected to a network, and wherein the particular network address is reserved for use by the network device while the specific non-network device is connected to the network device;

storing the designated network address in a lookup table containing the UDCI, wherein the lookup table associates the designated network address with the UDCI;

receiving, by the network address providing server, a request from a network device for a network address;

in response to the request from the network device for the network address including the UDCI to identify the specific non-network device, retrieving the designated network address from the lookup table based on the UDCI found in the request for the network address; and transmitting, from the network address providing server to the network device, the designated network address with authorization for the network device to use the designated network address as an authorized network address of the network device.

12. The computer program product of claim 11, wherein the method further comprises:

transmitting, to the network device, an instruction to request that authorization to use the authorized network address be refreshed;

receiving a request from the network device to refresh authorization for the network device to use the authorized network address; and in response to the request from the network device to refresh authorization failing to include the UDCI, rescinding the authorization for the network device to use the authorized network address as the designated network address of the network device.

13. The computer program product of claim 11, wherein the designated network address is an Internet Protocol (IP) address, and wherein the network address providing server is a Dynamic Host Configuration Protocol (DHCP) server.

14. The computer program product of claim 11, wherein the network device is a computer.

15. The computer program product of claim 14, wherein the non-network device is a projector that is connected to the computer.

16. A computer system for assigning and allocating network addresses to network devices, the system comprising:

a processor, a computer readable memory, and a non-transitory computer readable storage media;

first program instructions to designate a particular network address as a designated network address for use by any network device that is coupled to a specific non-network device, wherein the specific non-network device has a Unique Device Capability Identifier (UDCI), wherein the specific non-network device is not connected to a network, and wherein the particular network address is reserved for use by the network device while the specific non-network device is connected to the network device;

second program instructions to store the designated network address in a lookup table containing the UDCI, wherein the lookup table associates the designated network address with the UDCI;

third program instructions to receive a request from a network device for a network address;

fourth program instructions to, in response to the request from the network device for the network address including the UDCI, to identify the specific non-network device, retrieve the designated network address from the lookup table based on the UDCI found in the request for the network address; and fifth program instructions to transmit, to the network device, the designated network address with authorization for the network device to use the designated network address as an authorized network address of the network device; and wherein the first, second, third, fourth, and fifth program instructions are stored on the non-transitory computer readable storage media, and wherein the first, second, third, fourth, and fifth program instructions are executed by the processor via the computer readable memory.

17. The computer system of claim 16, further comprising:
sixth program instructions to transmit, to the network device, an instruction to request that authorization to use the authorized network address be refreshed;
seventh program instructions to receive a request from the network device to refresh authorization for the network device to use the authorized network address; and
eighth program instructions to, in response to the request from the network device to refresh authorization failing to include the UDCI, rescind the authorization for the network device to use the authorized network address as the designated network address of the network device;
and wherein the sixth, seventh, and eighth program instructions are stored on the computer readable storage media, and wherein the sixth, seventh, and eighth program instructions are executed by the processor via the computer readable memory.

18. The computer system of claim 16, wherein the designated network address is an Internet Protocol (IP) address, and wherein the computer system is a Dynamic Host Configuration Protocol (DHCP) server.

19. The method of claim 1, wherein the designated network address is from a general pool of available network addresses, and wherein the method further comprises:
receiving, by the network address providing server, a request to join the network by a new network device, wherein the new network device is coupled to a non-network device that has a UDCI found in the lookup table;
determining, by the network address providing server, that all network addresses from the general pool are currently in use;
determining, by the network address providing server, that one of the network addresses from the general pool is currently in use by a current network device that is not coupled to any non-network device having a UDCI found in the lookup table;
evicting the current network device from the network; and
assigning, by the network address providing server, a reassigned network address to the new network device, wherein the reassigned network address was previously used by the current network device before being evicted from the network.

* * * * *